3,776,865
WATER-REDUCIBLE ACID TERMINATED POLYMERIC FAT ACID POLYAMIDE RESINS USEFUL AS FLEXOGRAPHIC INK BINDERS
David W. Glaser and Roger A. Lovald, St. Paul, Minn., assignors to General Mills Chemicals, Inc.
No Drawing. Filed May 30, 1972, Ser. No. 258,023
Int. Cl. C08g 20/26
U.S. Cl. 260—18 N                    8 Claims

ABSTRACT OF THE DISCLOSURE

An acid terminated polymeric fat acid polyamide resin obtained by reacting an acid component comprising a polymeric fat acid and another dicarboxylic acid with an amine component comprising isophorone diamine or mixtures thereof with an alkylene diamine. The resins are particularly useful in flexographic inks where water reducibility of the resins is desirable.

---

This invention relates to acid terminated polymeric fat acid polyamides and in particular to polyamides obtained by reacting an acid component comprising a polymeric fat acid and another dicarboxylic acid with an amine component comprising isophoronediamine or mixtures thereof with an alkylene diamine. The resins are useful in aqueous systems particularly in flexographic inks where water reducibility is desirable.

In general, the resins are preferably prepared by reaction in the temperature range of about 100–300° C. accompanied by removal of any by-product water. The reaction is preferably carried out at about 250° C. The time of reaction may also be varied widely and will depend somewhat on temperature. Normally a time period of 3 to 8 hours after reaching the selected temperature is required. The preferred time of reaction is about 5 hours. A typical set of reaction conditions is 250° C. for a period of 5 hours. Vacuum may be applied if desired to withdraw volatile by-products and to keep the resin mixture from contact with air which may cause darkening. An inert gas may also be employed to avoid contact with air.

As indicated, the polymeric fat acid polyamides of this invention are acid terminated. By acid terminated is meant that the resins have relatively high acid members, i.e., an excess of acid over amine is employed. In order to provide the desirable water reducibility of the present invention, the resin should have acid values in the range of 45 to about 120, and preferably in the range of about 50–110. Such acid values are achieved by employing about .5–.75 amine equivalents per acid or carboxyl equivalent, i.e., 50–75 amine equivalents per 100 acid equivalents. By water reducibility is meant that a solution of the polyamide resin in relatively high concentration in conventional flexographic ink solvents, such as the alkanols having 2–5 carbon atoms, i.e., 30–40% concentration of polyamide in ethanol or propanol, can be reduced or diluted in the presence of a base by adding water thereto to very low concentrations, i.e., <1%, without causing incompatibility evidenced by cloudy or hazy solutions.

The polyamide resins of this invention are essentially copolymer resins using as the primary reactants a polymeric fat acid and isophorone diamine (1-amino-3-aminomethyl-3,5,5-trimethyl cyclohexane). Being a copolymer resin, a copolymerizing reactant is employed, namely a copolymerizing dicarboxylic acid, either aromatic, such as isophthalic or aliphatic, such as sebacic, adipic or azelaic. The isophorone diamine may be used alone or in admixture with other copolymerizing diamine such as the alkylene diamines having an alkylene group containing from 2–8 carbon atoms.

Typical compositions of commercially available polymeric fat acids, based on unsaturated $C_{18}$ fat acids (tall oil fatty acids) are

|  | Percent by weight |
|---|---|
| $C_{18}$ monobasic or monomeric fat acids ("monomer") | 5–15 |
| $C_{36}$ dibasic or dimeric fat acids ("dimer") | 60–80 |
| $C_{54}$ (and higher) polybasic or trimeric fat acids ("trimer") | 10–35 |

While the foregoing commercially available product is prepared by polymerization of unsaturated fatty acids in tall oil fatty acids, similar polymeric fat acids may be prepared from other monobasic or monocarboxylic aliphatic acids, naturally occurring or synthetic, having hydrocarbon chains of 8–24 carbon atoms which will be referred to herein as a "fat acid" or "monomeric fat acid." The preferred monocarboxylic acids are those having from 16–20 carbon atoms, the most preferred being those having 18 carbon atoms, such as oleic and linoleic acids, a mixture of which are found in tall oil fatty acids.

The relative ratios of monomer, dimer and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimeric fat acids and the term "trimeric fat acids" refers to the residual higher polymeric forms consisting primarily of trimer acids but containing some higher polymeric forms. The term "polymeric fat acids" as used herein is intended to be generic to polymerized acids obtained from "fat acids" and consists of a mixture of monomeric, dimeric and trimeric fat acids.

The ethylenically and acetylenically unsaturated fat acids which may be polymerized and their method of polymerization are described in the above mentioned U.S. Pat. 3,157,681. The saturated fat acids are generally polymerized by somewhat different techniques than those described in U.S. Pat. 3,157,681, but because of the functional similarity of the polymerization products, they are considered equivalent to those prepared by the methods described as applicable to the ethylenically and acetylenically unsaturated fat acids.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined analytically by conventional gas-liquid chromatography of the corresponding methyl esters. Another method of determination is a micromolecular distillation analytical method. This method is that of R. F. Paschke et al., J. Am. Oil Chem. Soc., XXXI (No. 1), 5, (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or higher) fraction is calculated based on the residue. Unless otherwise indicated herein, the gas-liquid chromatography (G.L.C.) method was employed in the analysis of the polymeric fat acids employed in this invention. When the gas-liquid chromatography technique is employed, a portion intermediate between monomeric fat acids and dimeric fat acids is seen, and is termed herein merely as "intermediate," since the exact nature thereof is not fully known. For this reason, the dimeric fat acid value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

The dimeric fat acid content of the polymeric fat acid for the purposes of this invention is not particularly critical and polymeric fat acids having a dimeric fat acid content below 25% by weight and greater than 70% by weight have been employed satisfactorily. It is, however, preferable that the dimeric fat acid content not be lower than 20% and not greater than 95% by weight. It is also preferable that the monomeric fat acid content not exceed about 45% by weight and the trimeric fat acid content not exceed about 35% by weight. It is desirable that the intermediate be low but polymeric fat acids generally having less than 15% and preferably less than 10% by weight are satisfactory.

As indicated, a copolymerizing dicarboxylic acid is employed in the acid component along with the polymeric fat acid. These copolymerizing acids are aliphatic, cycloaliphatic or aromatic dicarboxylic acids which may ideally be defined by the formula

HOOC—R—COOH where R is an aliphatic, cycloaliphtic or aromatic hydrocarbon radical having from 6 to 20 carbon atoms. Illustrative of such acids are adipic, sebacic, suberic, pimelic, azelaic, succinic, glutaric, isophthalic, terephthalic, phthalic acids, naphthalene dicarboxylic acids and 1,4- or 1,3-cyclohexane dicarboxylic acid. The dicarboxylic acids may be used alone or mixtures thereof may be employed. In the acid component the equivalent ester thereof may be employed in place of the acids per se such as the alkyl esters (1–8 carbon atoms).

The acid component will accordingly be a mixture of a polymeric fat acid and a copolymerizing dicarboxylic acid. On the basis of 100 carboxyl equivalent percent the acid component will comprise about 12.5–75 carboxyl equivalent percent of the polymeric fat acid and about 25–87.5 carboxyl equivalent percent of the copolymerizing dicarboxylic acid.

The amine component of the polyamide resin is comprised of isophorone diamine alone or mixtures thereof with other diamines, such as the alkylene diamines which are preferred and which can be represented by the formula

H$_2$N—R'—NH$_2$ where R' is an alkylene radical having from 2 to 8 carbon atoms such as ethylene diamine, diaminopropane, diaminobutane, and hexamethylene diamine. R' may be branched or straight chained, the straight chained radicals being more preferred. As earlier indicated in order to provide an acid terminated resin the amine component will be employed in an amount of about 50–75 amine equivalents per 100 carboxyl equivalents, or 0.5–0.75 amine equivalents per carboxyl equivalent. Considering the amine component alone (100 amine equivalent percent basis) the amine component would be comprised of about 20–100 amine equivalent percent of isophorone diamine and about 0.80 amine equivalent percent of the copolymerizing diamine.

The amounts of reactants in the polyamide resin may accordingly be expressed as follows:

Acid component—100 equivalents:  Eq. percent
   (a) Polymeric fat acids _____ 12.5–75
   (b) Co-dicarboxylic acid _____ 25–87.5
      Carboxyl eq. percent _____ 100

Amine component—50 to 75 equivalents:
   (a) Isophorone diamine _____ 20–100
   (b) Co-diamine _____ 0–80
      Amine eq. percent _____ 100

The invention can best be illustrated by means of the following examples.

EXAMPLE 1

A three-neck, one liter round bottom flask, fitted with thermometer, mechanical stirrer, and still head was charged with the following reactants:

0.705 equivalent (200 g.) of polymerized tall oil fatty acids (A)[1]
0.705 equivalents (214 g.) of polymerized tall oil fatty acids (B)[1]
1.41 equivalents (117 g.) of isophthalic acid
1.69 equivalents (146 g.) of isophorone diamine
3 drops phosphoric acid (as a catalyst)

[1] Gas-liquid chromatography analysis:
(A) Percent M=1.0, percent I=0.7, percent D=38.3, percent T=59.9.
(B) Percent M=72.8, percent I=13.9, percent D=14.1, percent T=0.

The reaction mixture was stirred and gradually heated to 250° C. while by-product water distilled out. It was held at 250° C. for 2 hours at atmospheric pressure and then an additional hour under vacuum (water aspirator—about 20 mm. mercury). The product was discharged and had a Ball and Ring Softening Point of 100° C., amine No. <2, and an acid value of 98.

This product when dissolved at 40% non-volatiles in 95% n-propanol gave a clear solution of Gardner color 9 with a Gardner-Holdt viscosity of Al. This solution, after neutralization with a suitable base could be diluted to <1% non-volatiles with water without evidence of separation or haze formation. The product could also be dissolved at 20% non-volatiles in a 20/80 mixture of n-propanol/water containing sufficient base to neutralize the free carboxylic acid groups.

Films, laid down of any of these solutions were clear, glossy and tack free.

Several resins were prepared by the above described method of preparation in which the reactants and amounts can be seen from the following Table I and the properties and evaluation thereof seen from the following Table II.

TABLE I

| | Composition—Equivalent percent | | | | | | |
|---|---|---|---|---|---|---|---|
| | Polymeric fat acid[1] | | | Iso-phthalic acid | Other acid | Iso-phorone diamine | Ethylene diamine |
| Example | A[2] | B[2] | C[2] | | | | |
| 1 | 25 | 25 | | 50 | | 60 | |
| 2 | | | 50 | 50 | | 60 | |
| 3 | | | 25 | 75 | | 70 | |
| 4 | | | 50 | 50 | | 60 | |
| 5 | 25 | 25 | | 50 | | 50 | |
| 6 | | | 12.5 | 87.5 | | 74 | |
| 7 | | 25 | | 25 | [3] 25 | 19 | 56 |
| 8 | | 25 | | 25 | [3] 25 | 25 | 48 |
| 9 | | 25 | 25 | | 50 | 30 | 30 |
| 10 | | | 50 | 50 | | 30 | 30 |
| 11 | | 25 | | 25 | [4] 25 | 37.5 | 37.5 |
| 12 | | 25 | | 25 | [3] 25 | 37.5 | 37.5 |
| 13 | | 25 | 25 | | 50 | 45 | 15 |

[1] Polymerized tall oil acids.
[2] Gas-liquid chromatography analysis: A—percent M=1.0, percent I=0.7, percent D=38.3, percent T=59.9; B—percent M=72.8, percent I=13.1, percent D=14.1, percent T=0; C—percent M=8.8, percent I=7.8, percent D=70.3, percent T=13.1.
[3] Adipic.
[4] Azelaic.

TABLE II

| Ex. | B. and R. softening point, °C. | Acid value | Resin tack | 40% non-volatiles (N.V.) in 95% n-propanol | | | Reducibility, percent N.V. at haze point |
| --- | --- | --- | --- | --- | --- | --- | --- |
| | | | | Color | Gardner-Holdt visc. | Clarity | |
| 1 | 100 | 98 | Free | 9 | A1 | Clear | <1 |
| 2 | | 81 | do | 8 | B | do | <1 |
| 3 | 160 | 81 | do | 8 | F | do | <1 |
| 4 | 110 | 89 | do | 7 | A | do | <1 |
| 5 | 80 | 119 | Sl. tacky | 9 | A1 | do | <1 |
| 6 | 171 | 80 | Free | 8 | E | do | <1 |
| 7 | 105 | 51 | do | 12 | H | do | <1 |
| 8 | 123 | 48 | do | 9 | H | do | <1 |
| 9 | 86 | 100 | do | 9 | A1 | do | <1 |
| 10 | 92 | 99 | do | 11 | A | do | <1 |
| 11 | 103 | 101 | do | 9 | F | do | <1 |
| 12 | 84 | 111 | do | 9 | A+ | do | <1 |
| 13 | 107 | 93 | do | 10 | A | do | <1 |

In the foregoing table, the Ball and Ring Softening Point is determined by ASTM E 28–59T. The acid value is expressed in terms of milligrams of potassium hydroxide (KOH) equivalent to the acid in one gram of the product. In the reducibility test, sufficient diethylamine was added to the 95% n-propanol solution to neutralize the free carboxyl functionality and distilled water was added to the haze point. Other similar polyamide resins prepared from other diamines (no isophorone diamine present) provided resins which were unsuitable for flexographic ink binders using water, either by being liquid or semi-solid products, providing tacky rather than tack free films or not being reducible with water to low concentrations.

As can be seen from the foregoing there are provided polyamide resins which can be reduced or diluted with water to very low concentration levels. The solutions of the resins are useful in various applications particularly printing ink applications. In the flexographic ink area of use the resin will generally be employed in aqueous alcohol solvent solutions which may include pigments to provide the various colored inks. The alcohols employed are preferably the alkanols which can be represented by the formula R″OH where R is an aliphatic hydrocarbon radical, straight or branched chain, having from 2–5 carbon atoms. The use of water in the systems has many advantages, some of which are:

(1) Water is less costly than organic solvent.
(2) Water does not pollute the atmosphere.
(3) Water is non-flammable.
(4) Water is readily available.
(5) Water is non-toxic.
(6) Water-based resin systems are excellent for use as printing ink media for printing on absorbent substrates such as paper, paper board, and the like.
(7) Water-based resin systems are compatible with water-borne wood pulp used in paper manufacture and with water systems used in textile treatments. They are also compatible with water-borne mine tailings and other aqueous effluents.

We claim:

1. A composition having improved water-reducibility consisting essentially of the amidification reaction product at temperatures of about 100–300° C. of (A) an acid component comprising (1) 12.5–75.0 carboxyl equivalent percent of a polymeric fat acid and (2) 25–87.5 carboxyl equivalent percent of a dicarboxylic acid of the formula HOOC—R—COOH where R is an aliphatic, cycloaliphatic or aromatic hydrocarbon radical having from 4–20 carbon atoms and (B) an amine component comprising (1) 20–100 amine equivalent percent of isophorone diamine and (2) 0–80 amine equivalent percent of an alkylene diamine wherein said alkylene group has from 2–8 carbon atoms, the ratio of amine equivalents from said amine component to carboxyl equivalents of said acid component being about 0.5–0.75 to provide an acid value in the range of about 45–120.

2. A composition as defined in claim 1 wherein said polymeric fat acid is a dimer of a $C_{16}$–$C_{20}$ unsaturated aliphatic monocarboxylic fatty acid.

3. A composition as defined in claim 1 wherein said polymeric fat acid is a dimer of a $C_{18}$ unsaturated aliphatic monocarboxylic fatty acid.

4. A composition as defined in claim 1 wherein said polymeric fat acid is polymerized tall oil fatty acids.

5. A composition as defined in claim 1 wherein said dicarboxylic acid is isophthalic acid.

6. A composition as defined in claim 1 wherein said dicarboxylic acid is a mixture of isophthalic acid and adipic acid.

7. A composition as defined in claim 1 wherein said dicarboxylic acid is a mixture of isophthalic acid and azelaic acid.

8. A composition as defined in claim 1 wherein said polymeric fat acid is polymerized tall oil fatty acids, said dicarboxylic acid is isophthalic acid, and said alkylene diamine is ethylene diamine.

References Cited

UNITED STATES PATENTS

| | | | |
| --- | --- | --- | --- |
| 3,622,604 | 11/1971 | Drawert et al. | 260—18 |
| 3,664,980 | 5/1972 | Vertnik | 260—18 |
| 3,352,836 | 11/1967 | Schmitt et al. | 260—78 |
| 3,352,835 | 11/1967 | Schmitt et al. | 260—78 |
| 3,383,391 | 5/1968 | Carlick et al. | 260—18 |

DONALD E. CZAJA, Primary Examiner

E. C. RZUCIDLO, Assistant Examiner

U.S. Cl. X.R.

106—27; 260—78 R, 404.5

PO-1050
(5/69)

UNITED STATES PATENT OFFICE
CERTIFICATE OF CORRECTION

Patent No. 3,776,865        Dated December 4, 1973

Inventor(s) David W. Glaser and Roger A. Lovald

It is certified that error appears in the above-identified patent and that said Letters Patent are hereby corrected as shown below:

Column 4, line 3 "0.80" should be ---0 - 80---.

Signed and sealed this 9th day of April 1974.

(SEAL)
Attest:

EDWARD M. FLETCHER, JR.
Attesting Officer

C. MARSHALL DANN
Commissioner of Patents